April 30, 1929.   W. V. ROBERTSON   1,710,950
SHEARS
Filed Dec. 28, 1927

Inventor,
William Victor Robertson.
By
Attorney.

Patented Apr. 30, 1929.

1,710,950

UNITED STATES PATENT OFFICE.

WILLIAM VICTOR ROBERTSON, OF WEEHAWKEN, NEW JERSEY.

SHEARS.

Application filed December 28, 1927. Serial No. 243,001.

In the cutting of material, when the length of cut is greater than can be made at a single closure, or when the cut follows a curved line, and it is necessary to use a number of operations of the shears in making the cut, it is desirable that the shear should not fully close in order to more conveniently feed the material to the shears, but there are occasions, when the cut is to be made up to a head in the material, when the shear should fully close so as to cut up to its points. This arises particularly in the trimming of the fins from molded rubber goods, such for example as the repair patches for footwear set forth in United States patent to James Robertson, Jr., Reissue No. 15,201.

The object of this invention is to provide a power-operated pair of shears which is adapted to such work, and a further object is to provide a pair of shears in which the power is sufficiently limited so that they cannot seriously injure the fingers of an operative.

In the accompanying sheet of drawings which forms a part of this description,

Figure 1:
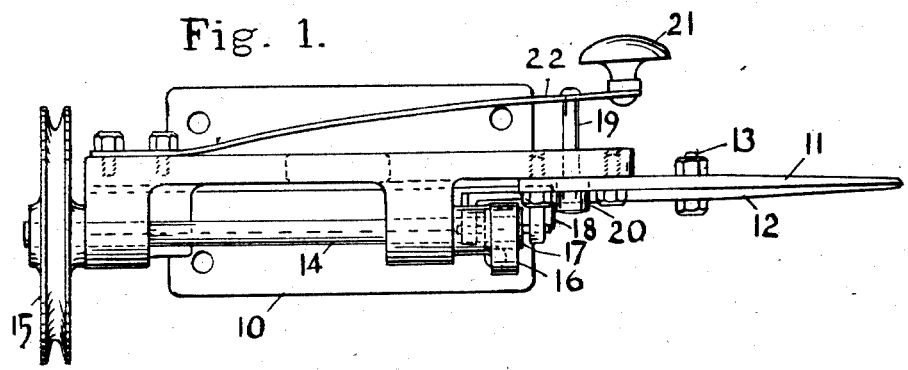
Figure 1 is a top view of a pair of shears which embodies this invention.
Figure 2:
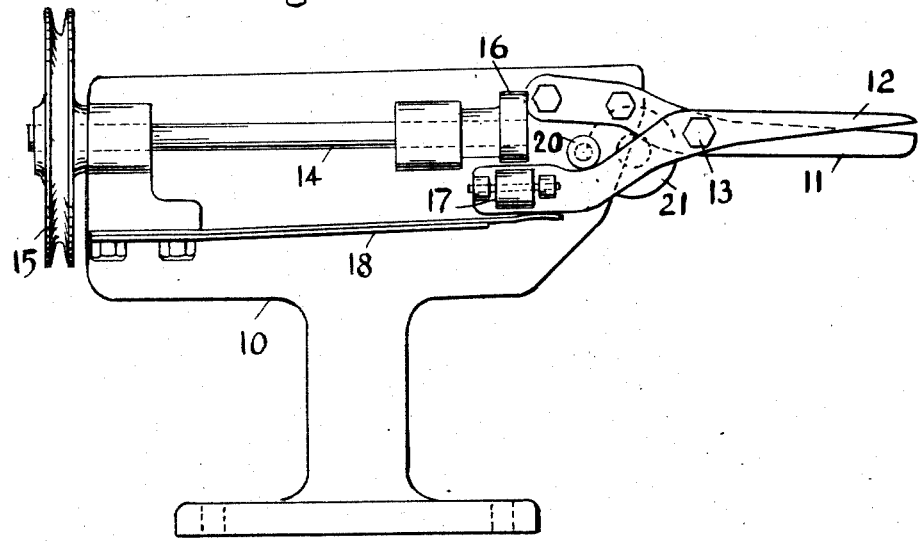
Fig. 2 is an elevation of the same.

A stand 10 has mounted thereon a fixed shear 11, and in cooperation with this fixed shear is a movable shear 12, conveniently of the pivoted type and pivoted at 13. The mounting is such that the points of the shears are exposed. A shaft 14 driven from a pulley 15, carries an eccentric 16 which bears against a cam roller 17 which is mounted on the rear arm of the movable blade and operates to open the shears. The movable blade is operated to close the shears by a leaf spring 18. A pin shank 19 passes through a hole in the stand and has a head 20 which constitutes a movable stop to the movable blade to prevent closure of the shears to their points. A button 21 is provided for pushing the stop out of the way to permit the spring to fully close the shears, the low point of the eccentric allowing of such full closure. A spring 22 returns the stop to its position for restricting the shears to partial closure.

A convenient size for the shears is double the scale of the original patent drawings or three times the scale of the customary patent reduction for the printed copies.

I claim:

1. The combination of a pair of shears, means for their power operation, means for changing the operation of the shears from partial to full closure, a button for operating the changing means for full closure, and automatic means for restoring the changing means to partial closure position.

2. The combination of a pair of shears, power operated means for opening the shears, a spring for closing the shears, a movable stop for restricting the shears to partial closure, manual means for operating the stop to permit full closure of the shears, and a spring for returning the stop to its position for restricting the shears to partial closure.

WILLIAM VICTOR ROBERTSON.